(12) United States Patent
Takayama

(10) Patent No.: US 7,940,295 B2
(45) Date of Patent: May 10, 2011

(54) IMAGE DISPLAY APPARATUS AND CONTROL METHOD THEREOF

(75) Inventor: Tomohiko Takayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1434 days.

(21) Appl. No.: 11/400,462

(22) Filed: Apr. 6, 2006

(65) Prior Publication Data
US 2006/0227209 A1  Oct. 12, 2006

(30) Foreign Application Priority Data

Apr. 8, 2005  (JP) ................................. 2005-112660

(51) Int. Cl.
*H04N 13/00* (2006.01)
*H04N 13/02* (2006.01)
*H04N 5/228* (2006.01)
*H04N 5/235* (2006.01)
*H04N 9/68* (2006.01)
*G03B 35/00* (2006.01)

(52) U.S. Cl. ........... 348/42; 348/46; 348/47; 348/222.1; 348/229.1; 348/230.1; 348/234; 396/324; 396/325

(58) Field of Classification Search ............ 348/42, 348/46, 47, 48, 51, 52, 53, 207.99, 222.1, 348/223.1, 224.1, 229.1, 230.1, 234, 333.01, 348/333.02; 396/322, 324, 325, 326, 327, 333, 334
See application file for complete search history.

(56) References Cited

U.S. PATENT DOCUMENTS

| | | | |
|---|---|---|---|
| 5,021,818 A * | 6/1991 | Satoh et al. .................. 396/234 |
| 5,903,303 A * | 5/1999 | Fukushima et al. ............ 348/47 |
| 6,972,796 B2 | 12/2005 | Katta et al. | |
| 6,987,534 B1 * | 1/2006 | Seta ........................... 348/229.1 |
| 7,190,389 B1 * | 3/2007 | Abe et al. ....................... 348/42 |
| 2004/0001074 A1 | 1/2004 | Oyaizu | |

FOREIGN PATENT DOCUMENTS

JP  2001-320616 A  11/2001
JP  2004-054890 A  2/2004

OTHER PUBLICATIONS

The above references were cited in a Feb. 22, 2010 Japanese Office Action, which is enclosed without English Translation, that issued in Japanese Patent Application No. 2005-112660.

* cited by examiner

*Primary Examiner* — David L Ometz
*Assistant Examiner* — Peter Chon
(74) *Attorney, Agent, or Firm* — Cowan, Liebowitz & Latman, P.C.

(57) ABSTRACT

On the basis of an image taken by a right image taking unit and/or an image taken by a left image taking unit, an imaging parameter common to the right and left image taking units is calculated. The calculated imaging parameter is set in the right and left image taking units.

3 Claims, 8 Drawing Sheets

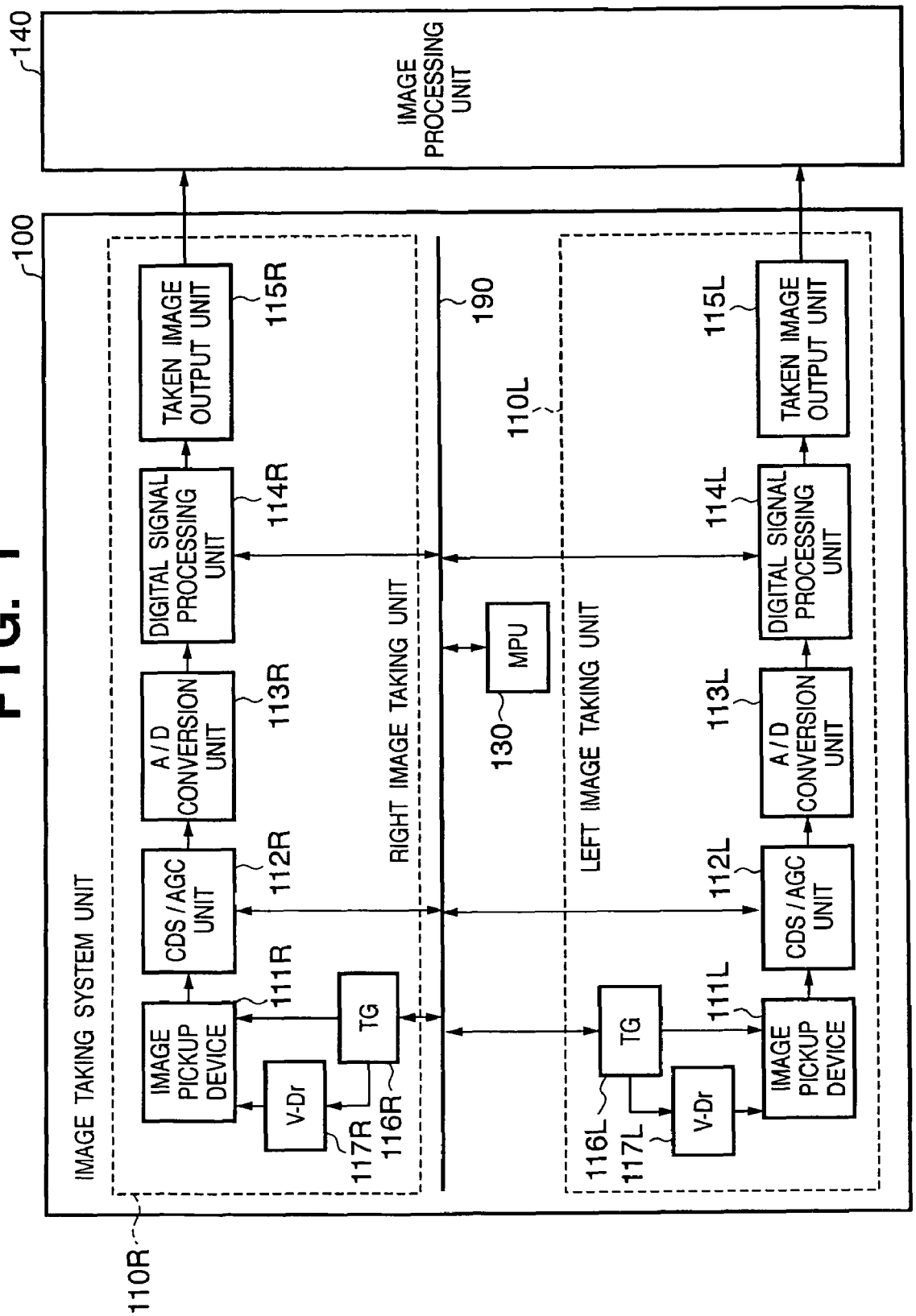

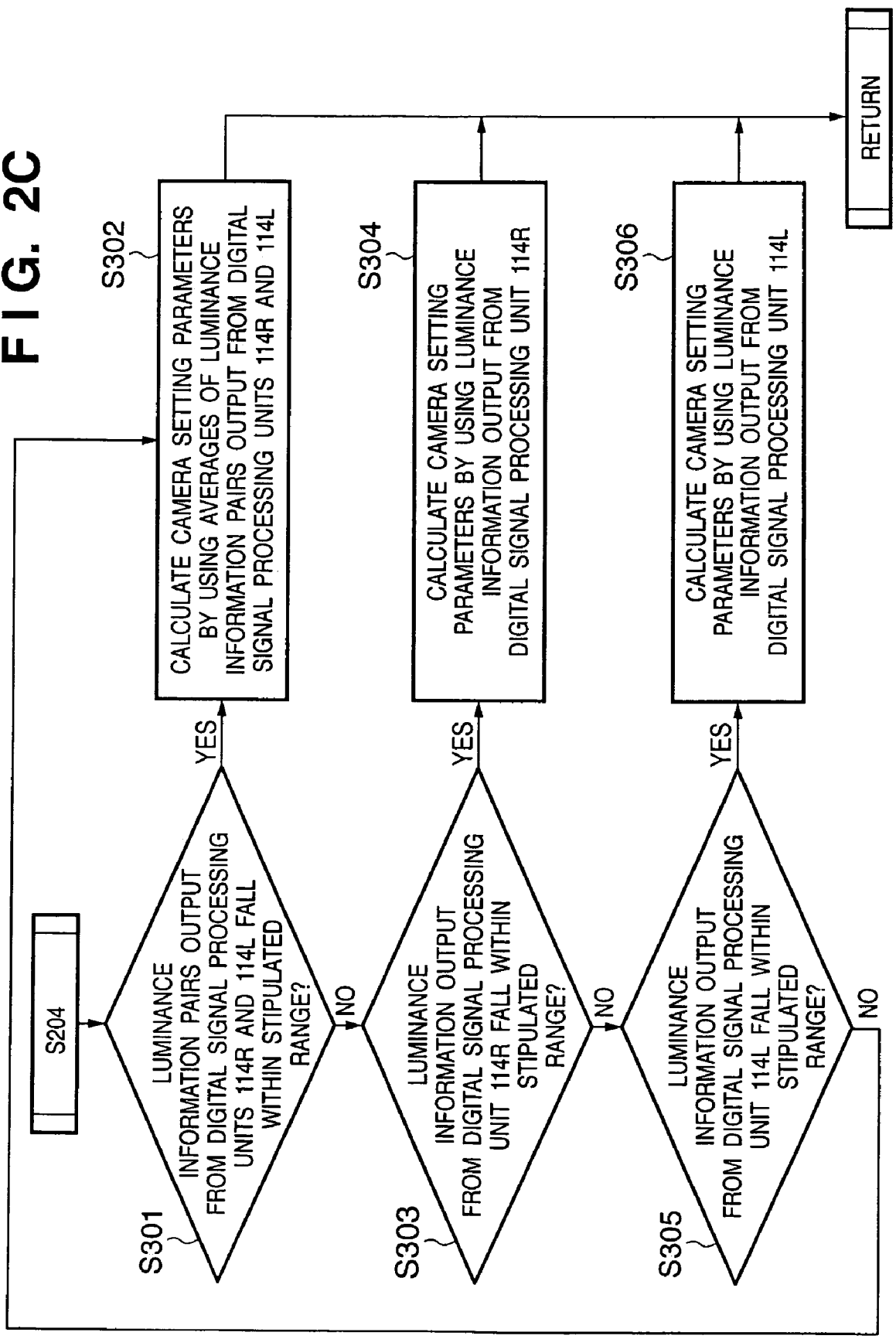

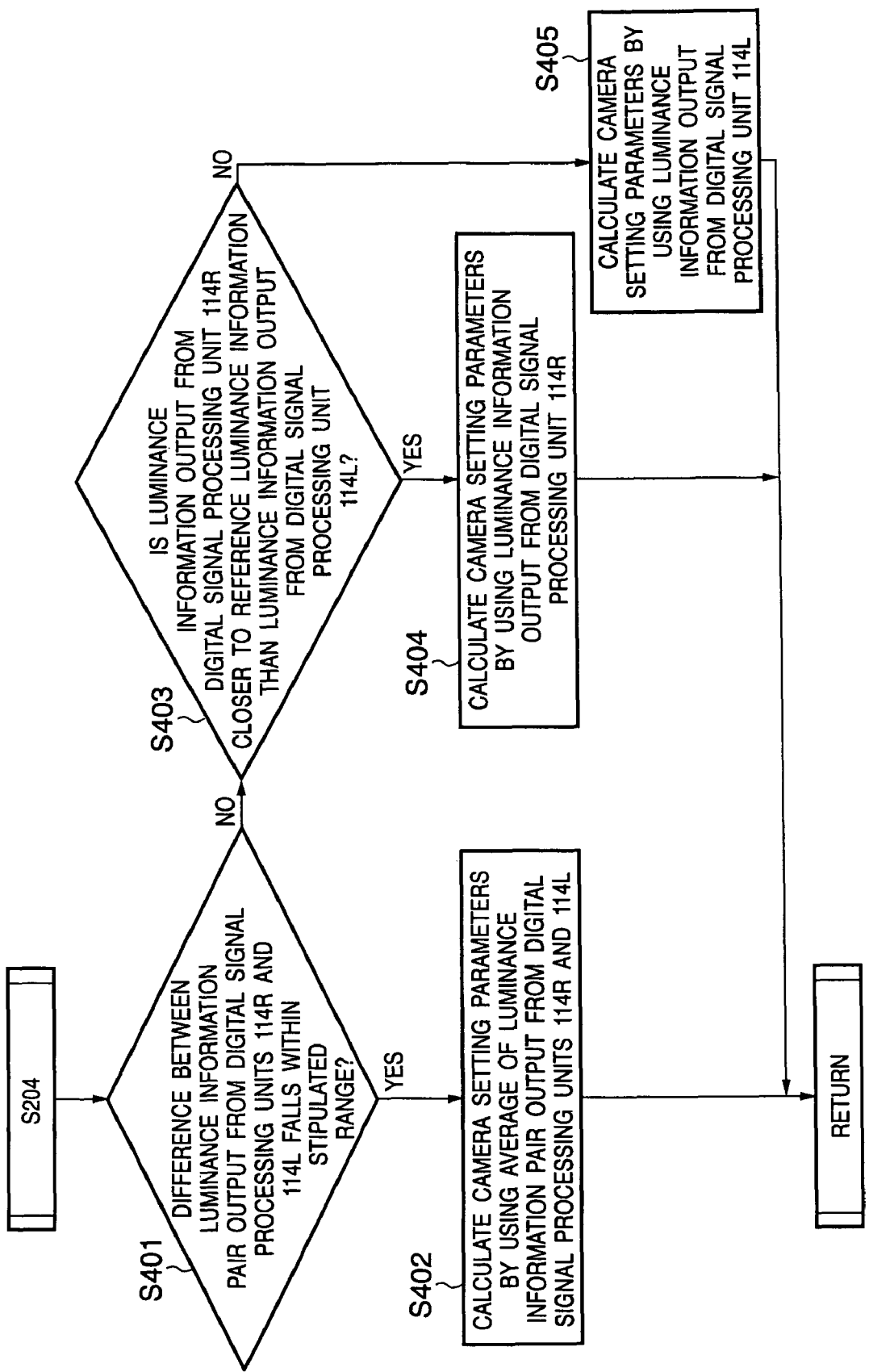

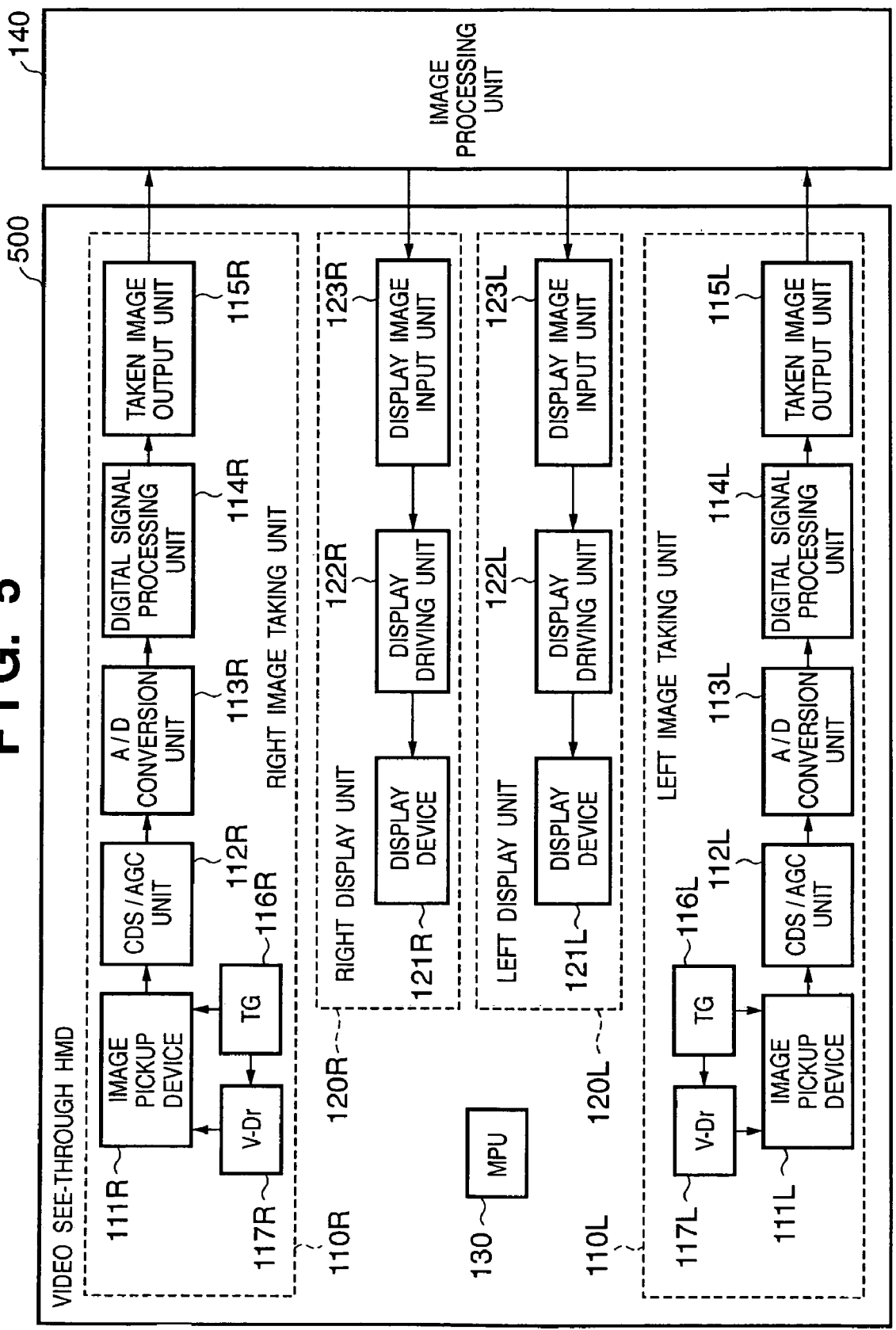

IMAGE DISPLAY APPARATUS AND CONTROL METHOD THEREOF

FIELD OF THE INVENTION

The present invention relates to a real space image taking technique.

BACKGROUND OF THE INVENTION

So-called MR (Mixed Reality) techniques are known recently as techniques of seamlessly merging a real world and a virtual world in real time. In a known MR technique, a video see-through type HMD (Head-Mounted Display) is used. An object which is almost coincident with an object observed from the pupil position of an HMD wearer is taken by, e.g., a video camera. The HMD wearer can observe an image obtained by superimposing CG (Computer Graphics) on the taken image.

FIG. 3 is a view showing the schematic arrangement of a general video see-through type HMD. The video see-through type HMD includes a pair of structures for right and left eyes. FIG. 3 illustrates only one structure. The HMD includes a display device 201 such as a right or left small liquid crystal display, a display optical system 202 such as a free-form surface prism to zoom and display a right or left image displayed on the display device, an image pickup device 301 to take an object which is almost coincident with an object observed from the position of a pupil 401 of an HMD wearer, and an image taking optical system 302 to make the position of the pupil 401 of the HMD wearer almost coincident with the position of the image pickup device 301. FIG. 4 shows the outer appearance of a video see-through type HMD 501 worn by a user.

FIG. 5 is a block diagram showing the main hardware configuration of a video see-through type HMD 500. The video see-through type HMD 500 includes image taking units 110R and 110L which take the external world, display units 120R and 120L which display a composited image of CG generated by an external image processing unit 140 and taken images obtained from the image taking units 110R and 110L, and an MPU 130 which controls the image taking units 110R and 110L and display units 120R and 120L.

The image taking units 110R and 110L include image pickup devices 111R and 111L such as CCD image sensors, TGs (Timing Generators) 116R and 116L which generate signals to drive the image pickup devices 111R and 111L, V-Drs (V Drivers) 117R and 117L which receive the signals from the TGs 116R and 116L and generate vertical signals, CDS/AGC units 112R and 112L which execute processing such as CDS (Correlated Double Sampling) and gain adjustment for analog signals output from the image pickup devices 111R and 111L, A/D conversion units 113R and 113L which convert the analog signals into digital signals, digital signal processing units 114R and 114L which execute gain control, tint control, luminance control, and gamma correction for the digital signals, and taken image output units 115R and 115L which convert the taken image signals output from the digital signal processing units 114R and 114L into an image format for, e.g., USB or IEEE 1394 and output the image signals to the image processing unit 140.

The display units 120R and 120L include display devices 121R and 121L such p-SiTFT or LCOS, display driving units 122R and 122L to control and drive the display devices 121R and 121L, and display image input units 123R and 123L which receive display image signals output from the image processing unit 140.

The image processing unit 140 is composed of a computer such as a PC (Personal Computer) or WS (WorkStation). The image processing unit 140 generates CG, composites it on a taken image received from the video see-through type HMD 500, and returns the image to the video see-through type HMD 500 again.

With the above-described arrangement, the HMD wearer can experience an MR world, in which the real world and virtual world are seamlessly merged in real time, by wearing the video see-through type HMD on his/her head.

The left and right image sensing units incorporated in the general video see-through type HMD have independent structures. For this reason, images taken by the left and right image taking units are not completely identical, and the left and right image taking conditions do not always match. For example, when AE (Auto Exposure processing) and AWB (Auto White Balance processing) are executed for each of the left and right image taking units, image taking conditions such as the analog gain, shutter speed, and RGB gain may not match between the left and right units, and the left and right taken images may have different brightness and tint levels.

As another problem, even when a locally bright image is taken on only one image taking screen, or only one image taking screen is covered with, e.g., a hand, the left and right images may have different brightness and tint levels.

SUMMARY OF THE INVENTION

The present invention has been made in consideration of the above-described problems, and has as its object to provide a technique of taking left and right images in accordance with the same imaging parameters.

In order to achieve an object of the present invention, for example, an image display apparatus of the present invention comprises the following arrangement.

That is, an image display apparatus comprising:

right-and left image taking means for taking right and left images of an real space;

output means for outputting the images taken by said right and left image taking means to an image processing unit;

right and left display means for displaying right and left display images based on right and left image signals output from the image processing unit;

calculation means for calculating an imaging parameter common to said right and left image taking means on the basis of the image taken by said right image taking means and/or the image taken by said left image taking means; and setting means for setting, in said right and left image taking means, the imaging parameter calculated by said calculation means.

In order to achieve an object of the present invention, for example, an image display apparatus of the present invention comprises the following arrangement.

That is, an image display apparatus which displays, on right and left display means, right and left images obtained by superimposing CG on images taken by right and left image taking means, the apparatus comprising:

selection means for selecting, on the basis of a relationship between first luminance information based on the image taken by said right image taking means and second luminance information based on the image taken by said left image taking means, the first luminance information and/or the second luminance information as luminance information to be used for obtaining an imaging parameter common to said right and left image taking means;

calculation means for calculating the imaging parameter common to said right and left image taking means by using the luminance information selected by said selection means; and setting means for setting, in said right and left image taking means, the imaging parameter calculated by said calculation means.

In order to achieve an object of the present invention, for example, a control method of an image display apparatus of the present invention comprises the following arrangement.

That is, a control method of an image display apparatus including right and left image taking means for taking right and left images of a real space, output means for outputting the images taken by said right and left image taking means to an image processing unit, and right and left display means for displaying right and left display images based on right and left image signals input from the image processing unit, the method comprising:

a calculation step of calculating an imaging parameter common to said right and left image taking means on the basis of the image taken by said right image taking means and/or the image taken by said left image taking means; and a setting step of setting, in said right and left image taking means, the imaging parameter calculated in the calculation step.

In order to achieve an object of the present invention, for example, a control method of an image display apparatus of the present invention comprises the following arrangement.

That is, a control method of an image display apparatus which displays, on right and left display means, right and left images obtained by superimposing CG on images taken by said right and left image taking means, the method comprising:

a selection step of selecting, on the basis of a relationship between first luminance information based on the image taken by said right image taking means and second luminance information based on the image taken by said left image taking means, the first luminance information and/or the second luminance information as luminance information to be used for obtaining an imaging parameter common to said right and left image taking means;

a calculation step of calculating the imaging parameter common to said right and left image taking means by using the luminance information selected in the selection step; and a setting step of setting, in said right and left image taking means, the imaging parameter calculated in the calculation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the hardware configuration of an image taking system unit which executes image taking processing in a video see-through type HMD (Head-Mounted Display) according to the first embodiment of the present invention;

FIG. 2C is a flowchart showing details of processing in step S204;

FIG. 2D is a flowchart showing details of processing in step S204 according to the second embodiment of the present invention;

FIG. 5 is a block diagram showing the main hardware configuration of a video see-through type HMD 500.

DETAILED DESCRIPTION OF THE PREFERRED EMBODIMENTS

Figure 2A:
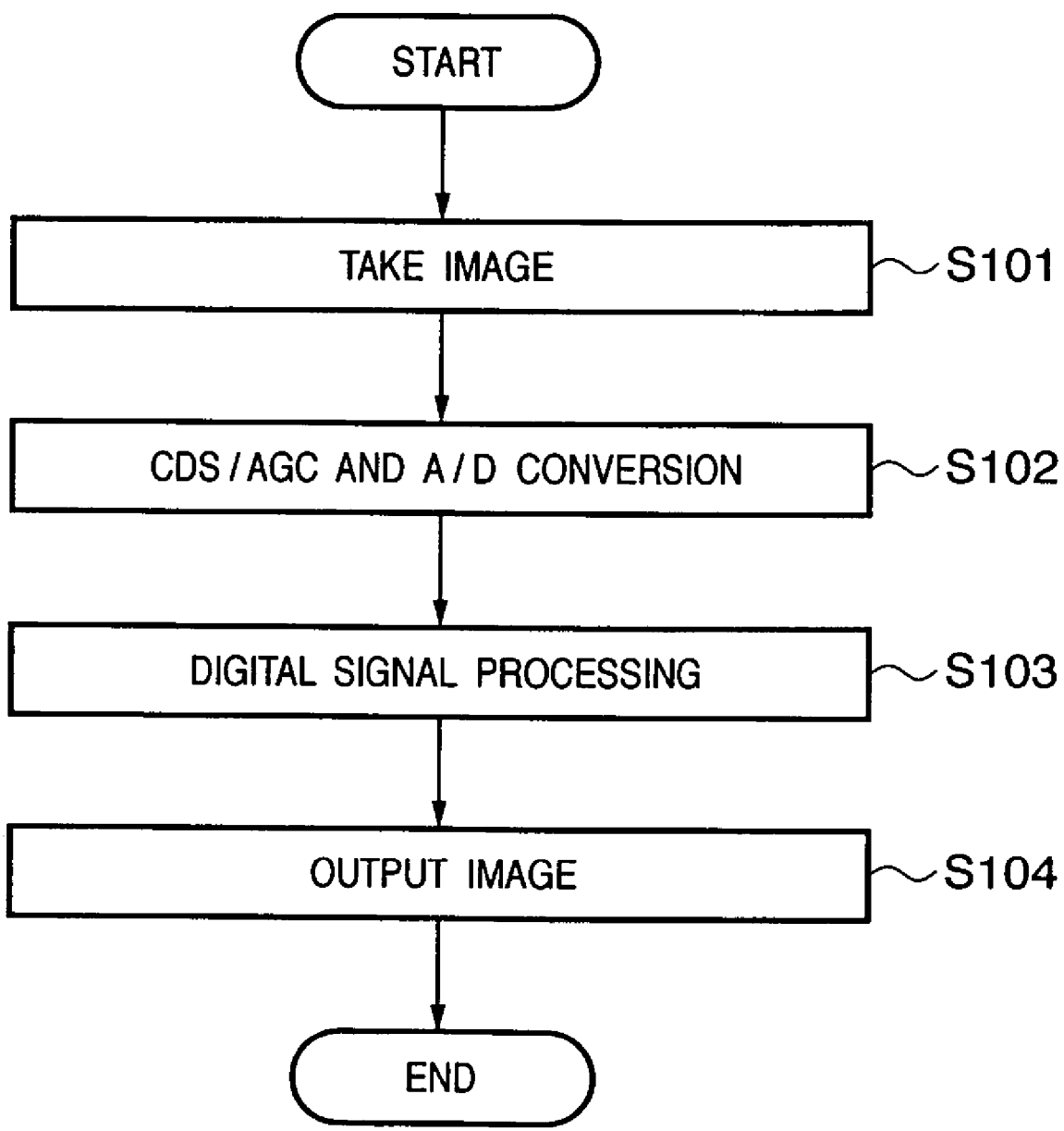
FIG. 2A is a flowchart of image taking processing of a real space corresponding to one frame by an image taking system unit 100.

Preferred embodiments of the present invention will now be described in detail in accordance with the accompanying drawings.

In the embodiments to be described below, an image display apparatus of the present invention is applied to a head-mounted display. However, the present invention need not always be applied to an image, display apparatus of this type and can also be applied to, e.g., a 3D display apparatus that displays left and right images in stripes on one screen.

First Embodiment

FIG. 1 is a block diagram showing the hardware configuration of an image taking system unit which executes image taking processing in a video see-through type HMD (Head-Mounted Display) according to the first embodiment. The same reference numerals as in FIG. 5 denote the same parts in FIG. 1.

As shown in FIG. 1, an image taking system unit 100 includes an image taking unit 110R which takes a real space for the right eye, an image taking unit 110L which takes a real space for the left eye, and an MPU 130 which controls the image taking units 110R and 110L. TGs 116R and 116L, CDS/AGC units 112R and 112L, and digital signal processing units 114R and 114L are connected to a common bus 190. These units can be controlled by the MPU 130 through the bus 190.

The image taking units 110R and 110L include image pickup devices 111R and 111L such as CCD image sensors, the TGs (Timing Generators) 116R and 116L which generate signals to drive the image pickup devices 111R and 111L, V-Drs (V Drivers) 117R and 117L which receive the signals from the TGs 116R and 116L and generate vertical signals, the CDS/AGC units 112R and 112L which execute processing such as CDS (Correlated Double Sampling) and gain adjustment for analog signals output from the image pickup devices 111R and 111L, A/D conversion units 113R and 113L which convert the analog signals output from the CDS/AGC units 112R and 112L into digital signals, the digital signal processing units 114R and 114L which execute gain control, tint control, luminance control, and gamma correction for the digital signals output from the A/D conversion units 113R and 113L, and taken image output units 115R and 115L which convert the sensed image signals, i.e., the digital signals output from the digital signal processing units 114R and 114L into an image format for, e.g., USB or IEEE 1394 and output the signals to an image processing unit 140.

The image processing unit 140 is composed of computer such as a PC (Personal Computer) or WS (WorkStation). The image processing unit 140 generates CG, composites it on a taken image received from the video see-through type HMD 100, and returns the image to the video see-through type HMD 100 again.

Even the video see-through type HMD according to this embodiment comprises the display units 120R and 120L shown in FIG. 5. The processing of these units is the same as described above, and a description thereof will be omitted.

The MPU 130 acquires luminance information (AE luminance information) in an AE (Auto Exposure processing,) area and luminance information (AWB luminance information) in an AWB (Auto White Balance processing) area in images output from the digital signal processing units 114R and 114L, and on the basis of these pieces of information, calculates imaging parameters (e.g., the analog gain, shutter speed, and RGB gain) to be commonly set in the right and left image taking units 110R and 110L. The calculated analog gain is set in the CDS/AGC units 112R and 112L. The shutter speed is set in the TGs 116R and 116L. The RGB gain is set in the digital signal processing units 114R and 114L.

In this way, common imaging parameters (camera setting parameters) can be set in the right and left image taking units 110R and 110L. The imaging parameter calculation processing will be described later.

Image taking processing of a real space corresponding to one frame by the image taking system unit 100 will be described next with reference to the flowchart of the processing shown in FIG. 2A. Processing according to the flowchart in FIG. 2A is implemented by causing the MPU 130 to control the units in the image taking system unit 100. Programs and data used by the MPU 130 for this control are stored in a ROM (not shown) in the MPU 130. The control processing is executed by using the programs and data.

The image pickup devices 111R and 111L of the image taking units 110R and 110L take images which are almost coincident with images observed from the pupil positions of the wearer of the video see-through type HMD 100, i.e., images which are shifted by only the base line length corresponding to the left and right pupil positions (step S101).

The object images taken by the image pickup devices 111R and 111L are input to the CDS/AGC units 112R and 112L as analog signals. The CDS/AGC units 112R and 112L execute processing such as CDS (Correlated Double Sampling) and gain adjustment for the received analog signals and output them to the A/D conversion units 113R and 113L. The A/D conversion units 113R and 113L convert the signals (analog signals) received from the CDS/AGC units 112R and 112L into digital signals (step S102).

The image signals converted into digital signals by the A/D conversion units 113R and 113L are input to the digital signal processing units 114R and 114L. The digital signal processing units 114R and 114L execute processing such as gain control, tint control, luminance control, and gamma correction for the image signals (step S103). The processed image signals are output to the taken image output units 115R and 115L. The taken image output units 115R and 115L output the image signals to the image processing unit 140 (step S104.

With the above-described processing, images (right and left images) of the real space corresponding to one frame can be taken and sent to the image processing unit 140.

Figure 2B:
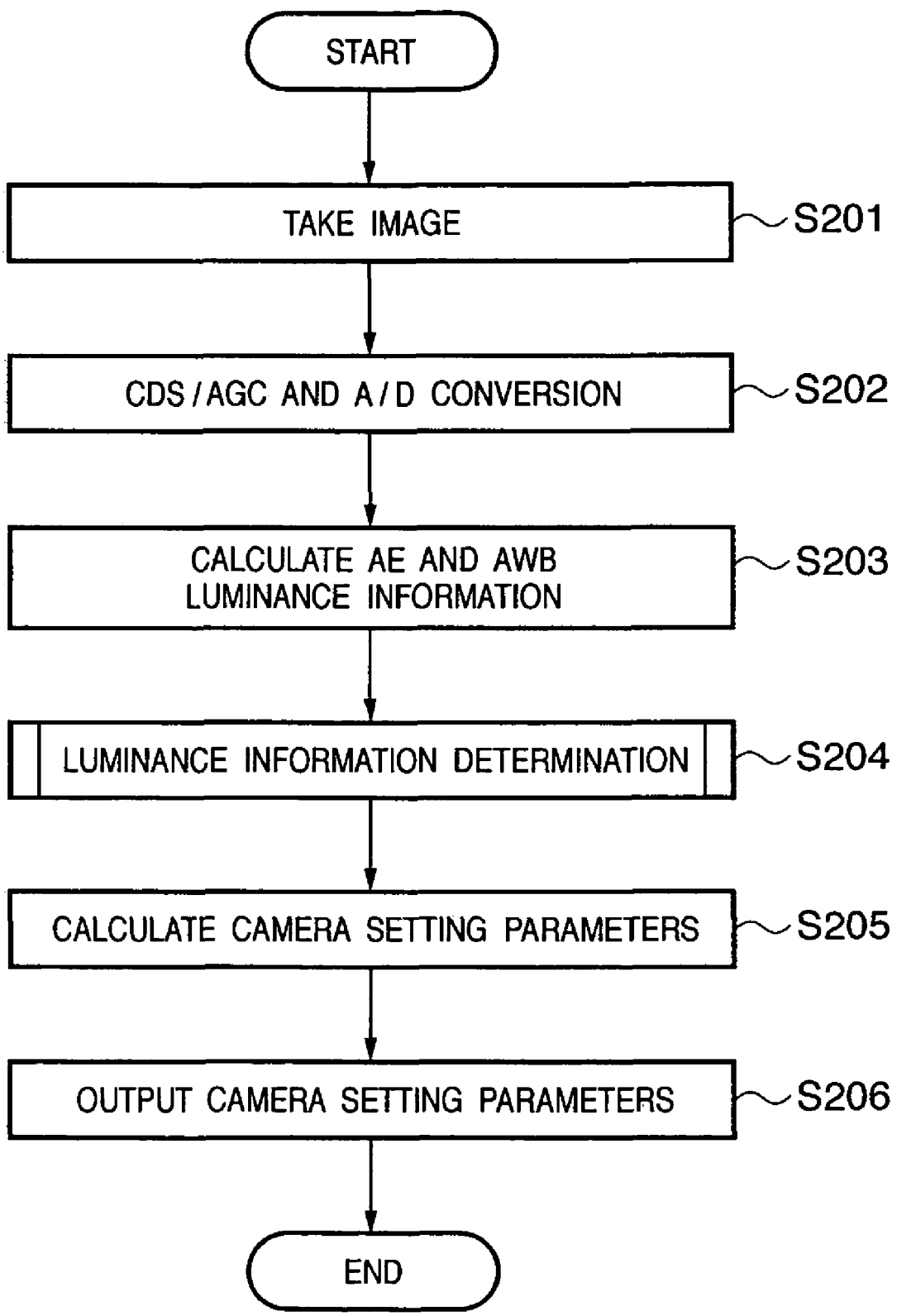
FIG. 2B is a flowchart of AE (Auto Exposure processing) and AWB (Auto White Balance processing) executed for left and right image taking units 110L and 110R.
Figure 3:
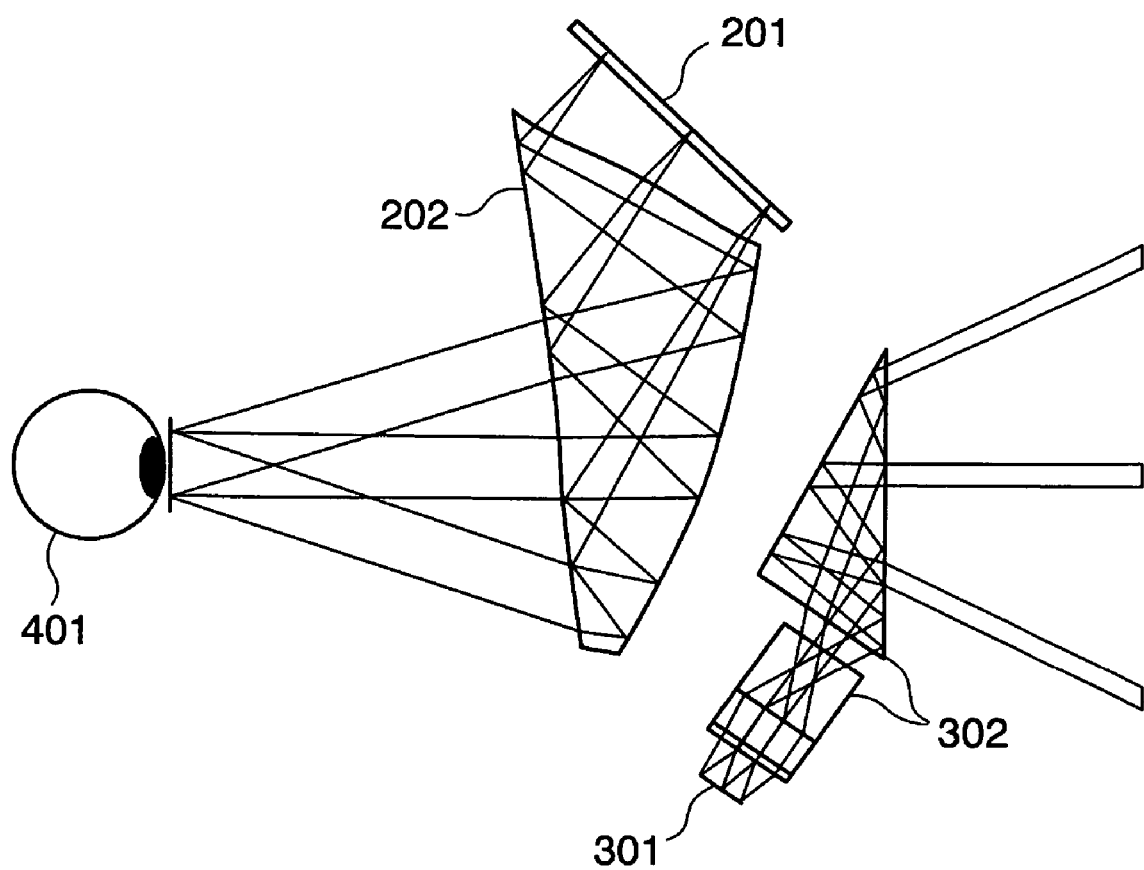
FIG. 3 is a view showing the schematic arrangement of a general video see-through type HMD.
Figure 4:
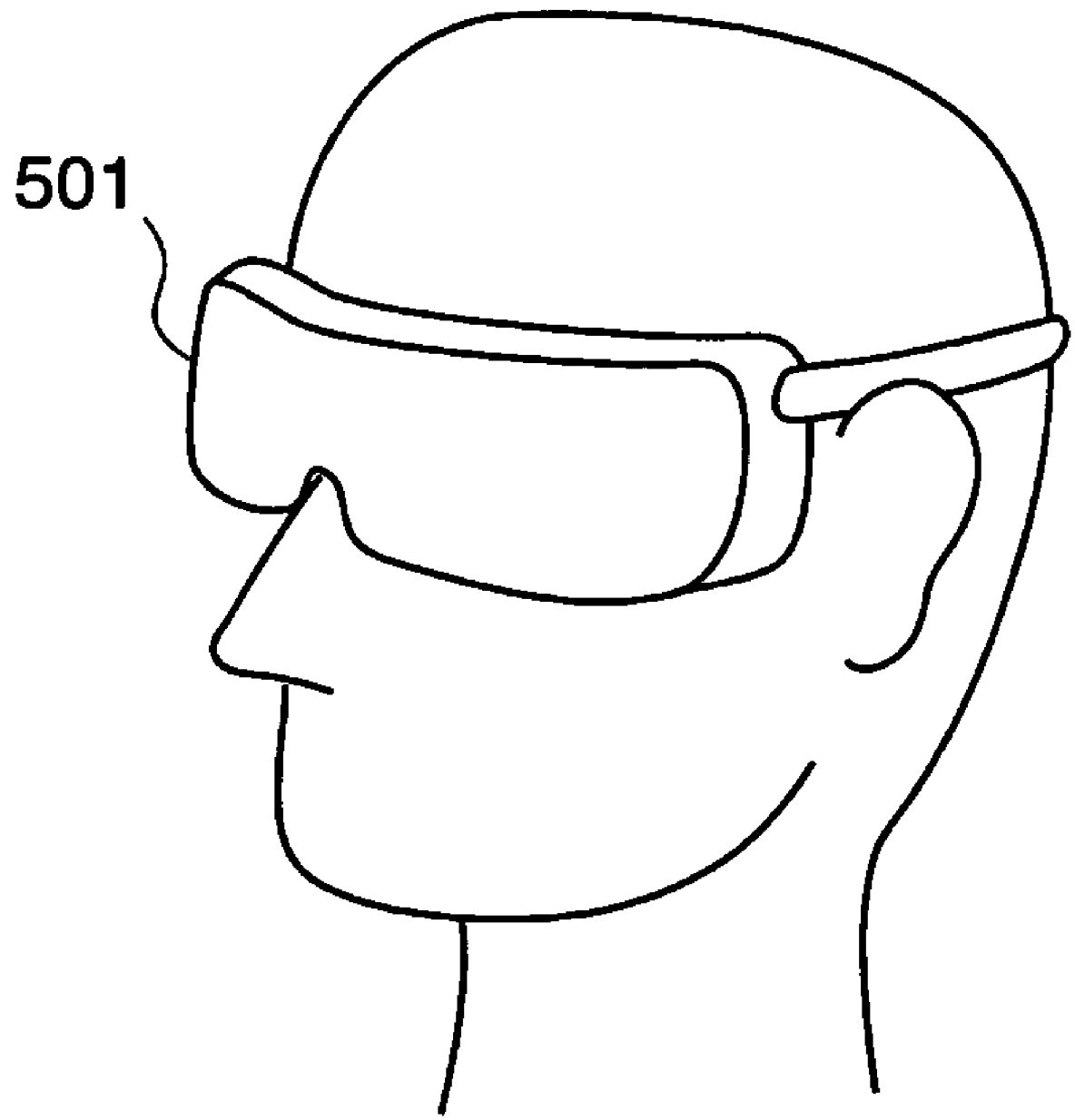
FIG. 4 is a view showing the outer appearance of a video see-through type HMD 501 worn by a user.

AE (Auto Exposure processing) and AWB (Auto White Balance processing) executed for the left and right image taking units 110L and 110R will be described below with reference to the flowchart of the processing shown in FIG. 2B.

In steps S201 and S202, the processing in steps S101 and S102 is executed. That is, the following processing is executed by using image signals as digital signals acquired by image taking processing of one frame.

The image signals converted into digital signals by the A/D conversion units 113R and 113L are input to the digital signal processing units 114R and 114L. By referring to the image signals, the digital signal processing units 114R and 114L calculate luminance information in each of the AE and AWB areas which are predetermined in the images (step S203).

More specifically, the digital signal processing unit 114R calculates luminance information by referring to pixel values in the AE area in the image obtained from the A/D conversion unit 113R and also calculates luminance information by referring to pixel values in the AWB area. Similarly, the digital signal processing unit 114L calculates luminance information by referring to pixel values in the AE area in the image obtained from the A/D conversion unit 113L and also calculates luminance information by referring to pixel values in the AWB area.

Next, the MPU 130 executes processing of obtaining imaging parameters such as an analog gain, shutter speed, and RGB gain to be commonly set in the left and right image taking units 110L and 110R. To obtain the imaging parameters, two luminance information pairs (AR luminance information and AWB luminance information) obtained by the digital signal processing units 114R and 114L or only one luminance information obtained by one digital signal processing unit are used. One or two information to be used are determined in accordance with the situation.

For example, if a highlight is taken by only the right image taking unit 110R, or light is shielded by covering only the right image taking unit 110R with a hand, the AE luminance information and AWB luminance information output from the digital signal processing unit 114R of the image taking unit 110R are greatly different from those of the image taking unit 110L.

In such a case, whether to obtain the imaging parameters by using only the luminance information output from the digital signal processing unit 114L, only the luminance information output from the digital signal processing unit 114R, or the luminance information output from both digital signal processing units is determined depending on whether the pieces of luminance information output from the digital signal processing units 114R and 114L fall outside a predetermined stipulated range.

FIG. 2C is a flowchart showing details of processing in step S204.

First, the MPU 130 refers to the luminance information acquired from the digital signal processing unit 114R and determines whether each information represents a luminance value within a predetermined stipulated range. In addition, the MPU 130 refers to the luminance information acquired from the digital signal processing unit 114L and determines whether each information represents a luminance value within a predetermined stipulated range (step S301).

If the two luminance information pairs acquired from the digital signal processing units 114R and 114L indicate luminance values within the stipulated range, the processing advances to step S302 to determine to obtain the imaging parameters by using the pieces of luminance information obtained by the digital signal processing unit 114R and those obtained by the digital signal processing unit 114L (step S302).

If it is determined in step S301 that the luminance information acquired from the digital signal processing unit 114R indicate luminance values within the stipulated range although the luminance information acquired from the digital signal processing unit 114L indicate luminance values outside the stipulated range, the processing advances to step S304 via step S303 to determine to obtain the imaging parameters by using only the luminance information obtained by the digital signal processing unit 114R (step S304).

If it is determined in step S301 that the luminance information acquired from the digital signal processing unit 114L indicate luminance values within the stipulated range although the luminance information acquired from the digital signal processing unit 114R indicate luminance values outside the stipulated range, the processing advances to step S306 via steps S303 and S305 to determine to obtain the imaging parameters by using only the luminance information obtained by the digital signal processing unit 114L (step S306).

In the above-described way, the luminance information to be used for obtaining the imaging parameters can be determined.

Referring back to FIG. 2B, the MPU 130 obtains the imaging parameters such as the analog gain, shutter speed, and RGB gain by using the luminance information determined to use by the processing in step S204 (step S205).

If it is determined to obtain the imaging parameters by using the two luminance information pairs acquired from the digital signal processing units 114L and 114R, the MPU 130 obtains the average value (average AE area luminance information) of the luminance information in the AE area obtained by the digital signal processing unit 114R and the luminance information in the AE area obtained by the digital signal processing unit 114L. The MPU 130 also obtains the average value (average AWB area luminance information) of the luminance information in the AWB area obtained by the digital signal processing unit 114R and the luminance information in the AWB area obtained by the digital signal processing unit 114L. On the basis of the obtained average AE area luminance information and average AWB area luminance information, the imaging parameters such as the analog gain, shutter speed, and RGB gain are obtained.

Processing of obtaining such imaging parameters by using luminance information in the AE area and luminance information in the AWB area is a known technique, and a description thereof will be omitted. In this embodiment, three imaging parameters, i.e., the analog gain, shutter speed, and RGB gain are obtained. Any other parameter may also be obtained.

If it is determined to obtain the imaging parameters by using the luminance information acquired from one of the digital signal processing units 114R and 114L, the MPU 130 obtains the imaging parameters such as the analog gain, shutter speed, and RGB gain on the basis of the AE area luminance information and AWB area luminance information acquired from the digital signal processing unit determined to use.

With the above processing, even when images obtained by the image taking units largely differ because, e.g., the image obtained by one image taking unit is darker as a whole than the image obtained by the other image taking unit, imaging parameters common to the image taking units can be obtained. When these imaging parameters are set, conditions such as brightness and tint of the images taken by the image taking units can be equalized.

The MPU 130 sets the obtained analog gain in the CDS/AGC units 112R and 112L, the obtained shutter speed in the TGs 116R and 116L, and the obtained RGB gain in the digital signal processing units 114R and 114L (step S206).

As described above, according to this embodiment, the same camera parameters such as the analog gain, shutter speed, and RGB gain can be determined for the left and right image taking units 110R and 110L. For this reason, satisfactory image taking can be done without changing the conditions such as brightness and tint between the left and right image taking units.

Even when the image taking screen states of the left and right image taking units largely differ from each other because only one image taking unit is covered with a hand, or the light source is taken, satisfactory image taking can be done by using appropriate camera parameters in the left and right image taking units.

Second Embodiment

In the second embodiment, processing in step S204 to determine luminance information to be used for obtaining imaging parameters is different from that of the first embodiment.

FIG. 2D is a flowchart showing details of processing in step S204 according to the second embodiment.

First, an MPU 130 obtains a difference value (AE difference value) between a luminance value represented by AE area luminance information obtained by a digital signal processing unit 114R and a luminance value represented by AE area luminance information obtained by a digital signal processing unit 114L. The MPU 130 also obtains a difference value (AWB difference value) between a luminance value represented by AWB area luminance information obtained by the digital signal processing unit 114R and a luminance value represented by AWB area luminance information obtained by the digital signal processing unit 114L. The MPU 130 determines whether each difference value falls within a stipulated range (step S401).

If both of the AE difference value and AWB difference value fall within the stipulated range, the processing advances to step S402 to determine to obtain the imaging parameters by using the two luminance information pair obtained by the digital signal processing units 114R and 114L (step S402).

If neither the AE difference value nor AWB difference value fall within the stipulated range, the processing advances to step S403 to determine whether the luminance information acquired from the digital signal processing unit 114R indicates a luminance value closer to predetermined reference luminance information than the luminance information acquired from the digital signal processing unit 114L (step S403). If the luminance information acquired from the digital signal processing unit 114R indicates a luminance value closer to the predetermined reference luminance information than the luminance information acquired from the digital signal processing unit 114L, the processing advances to step S404 to determine to obtain the imaging parameters by using only the luminance information obtained by the digital signal processing unit 114R (step S404).

If the luminance information acquired from the digital signal processing unit 114L indicates a luminance value closer to the predetermined reference luminance information than the luminance information acquired from the digital signal processing unit 114R, the processing advances to step S405 to determine to obtain the imaging parameters by using only the luminance information obtained by the digital signal processing unit 114L (step S405).

In the above-described way, the luminance information to be used for obtaining the imaging parameters can be determined.

Various kinds of processing are available to determine the luminance information to be used for obtaining the imaging parameters. For example, the following processing can also be used. If a period when only the luminance information obtained from one image taking unit fall outside a stipulated range continues for a predetermined time (e.g., five min) or more, or a period when the difference between the luminance information pairs output from the left and right image taking units falls outside a stipulated range continues for a predetermined time (e.g., five min) or more, the MPU 130 instructs warning issue. For example, a warning message text may be displayed on the display screen of the video see-through type HMD. Alternatively, the image processing unit 140 capable of generating sound may be instructed to generate alarm sound.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-112660, filed Apr. 8, 2005, which is hereby incorporated by reference herein in its entirety.

What is claimed is:

1. An image display apparatus comprising:
   right and left image taking means for taking right and left images of a real space;
   output means for outputting the images taken by said right and left image taking means to an image processing unit;
   right and left display means for displaying right and left display images based on right and left image signals output from the image processing unit;
   calculation means for calculating an imaging parameter common to said right and left image taking means on the basis of the image taken by said right image taking means and/or the image taken by said left image taking means; and
   setting means for setting, in said right and left image taking means, the imaging parameter calculated by said calculation means; and
   wherein said calculation means comprises:
   first means for obtaining first luminance information in a predetermined area in the image taken by said right image taking means;
   second means for obtaining second luminance information in a predetermined area in the image taken by said left image taking means; and
   third means for determining, on the basis of a luminance value represented by the first luminance information and a luminance value represented by the second luminance information, at least one of the first luminance information and the second luminance information as luminance information to be used for obtaining the imaging parameter, and
   wherein the imaging parameter is obtained by using the luminance information determined by said third means; and
   wherein said third means
   determines to use the first luminance information and the second luminance information to obtain the imaging parameter when both the luminance value represented by the first luminance information and the luminance value represented by the second luminance information fall within a stipulated range,
   determines to use the first luminance information to obtain the imaging parameter when only the luminance value represented by the first luminance information falls within the stipulated range, and
   determines to use the second luminance information to obtain the imaging parameter when only the luminance value represented by the second luminance information falls within the stipulated range.

2. The apparatus according to claim 1, wherein the image display apparatus comprises an HMD (Head-Mounted Display).

3. A control method of an image display apparatus including
   right and left image taking means for taking right and left images of a real space,
   output means for outputting the images taken by said right and left image taking means to an image processing unit, and
   right and left display means for displaying right and left display images based on right and left image signals output from the image processing unit, the method comprising:
   a calculation step of calculating an imaging parameter common to said right and left image taking means on the basis of the image taken by said right image taking means and/or the image taken by said left image taking means; and
   a setting step of setting, in said right and left image taking means, the imaging parameter calculated in the calculation step;
   wherein said calculation step comprises:
   obtaining first luminance information in a predetermined area in the image taken by said right image taking means;
   obtaining second luminance information in a predetermined area in the image taken by said left image taking means; and
   determining, on the basis of a luminance value represented by the first luminance information and a luminance value represented by the second luminance information, at least one of the first luminance information and the second luminance information as luminance information to be used for obtaining the imaging parameter, and
   wherein the imaging parameter is obtained by using the luminance information determined in said determining step; and
   wherein said determining step
   determines to use the first luminance information and the second luminance information to obtain the imaging parameter when both the luminance value represented by the first luminance information and the luminance value represented by the second luminance information fall within a stipulated range,
   determines to use the first luminance information to obtain the imaging parameter when only the luminance value represented by the first luminance information falls within the stipulated range, and
   determines to use the second luminance information to obtain the imaging parameter when only the luminance value represented by the second luminance information falls within the stipulated range.

* * * * *